(12) United States Patent
Marks, Jr.

(10) Patent No.: US 7,283,155 B1
(45) Date of Patent: Oct. 16, 2007

(54) CAMERA ACTUATOR SYSTEM

(76) Inventor: Franklin J. Marks, Jr., HCR 3 Box 107, Burnsville, VA (US) 24487

( * ) Notice: Subject to any disclaimer, the term of this patent is extended or adjusted under 35 U.S.C. 154(b) by 854 days.

(21) Appl. No.: 10/707,464

(22) Filed: Dec. 16, 2003

Related U.S. Application Data

(60) Provisional application No. 60/434,217, filed on Dec. 17, 2002.

(51) Int. Cl.
*H04N 7/18* (2006.01)

(52) U.S. Cl. ............................... 348/85; 348/61
(58) Field of Classification Search ................ 348/85, 348/61
See application file for complete search history.

(56) References Cited

U.S. PATENT DOCUMENTS 5,652,617 A * 7/1997 Barbour ................... 348/85

* cited by examiner

*Primary Examiner*—Allen Wong
(74) *Attorney, Agent, or Firm*—John J. Elnitski, Jr.

(57) ABSTRACT

A camera actuator system that includes a camera and actuator components. The actuator components are used to move and stop the camera. The actuator components are driven by the motor. The actuator components include a rear pan stop, drive shaft spacer, tilt cable, rear tilt pulley, support block, friction O-ring, stop collar, camera support legs, front pan stop and a front tilt pulley. The drive shaft spacer, lower tilt pulley, support block, friction O-ring and stop collar all have shaft holes, which allow the drive shaft to pass on through to each component.

20 Claims, 14 Drawing Sheets

CAMERA ACTUATOR SYSTEM

CROSS REFERENCE TO RELATED APPLICATIONS

This application claims the benefit of and incorporates by reference U.S. Provisional Application No. 60/434,217 filed Dec. 17, 2002.

BACKGROUND OF INVENTION

The present invention generally relates to camera systems used for looking into tight confines, such as bore hole and water wells. More specifically, the present invention relates to a camera system with a simplified motorized camera actuator system to aid in movement of a camera in tight unfriendly environments, such as bore holes and water wells.

There are many different types of camera systems which can be used in tight confines, such as bore holes and water wells. Most of these devices lack ease of use when trying to rotate and position a camera in the tight unfriendly environment which could contain detrimental particles of dirt and water. Other camera systems with improved ease of use utilize sophisticated components which are easily damaged in unfriendly environments.

It is an object of the present invention to provide a camera actuator system that is easy to use and durable in tight unfriendly environments.

SUMMARY OF INVENTION

A camera actuator system that includes a camera and actuator components. The actuator components are used to move and stop the camera. The actuator components are driven by the motor. The actuator components include a rear pan stop, drive shaft spacer, tilt cable, rear tilt pulley, support block, friction O-ring, stop collar, camera support legs, front pan stop and a front tilt pulley. The drive shaft spacer, lower tilt pulley, support block, friction O-ring and stop collar all have shaft holes, which allow the drive shaft to pass on through to each component.

DETAILED DESCRIPTION

Figure 1:
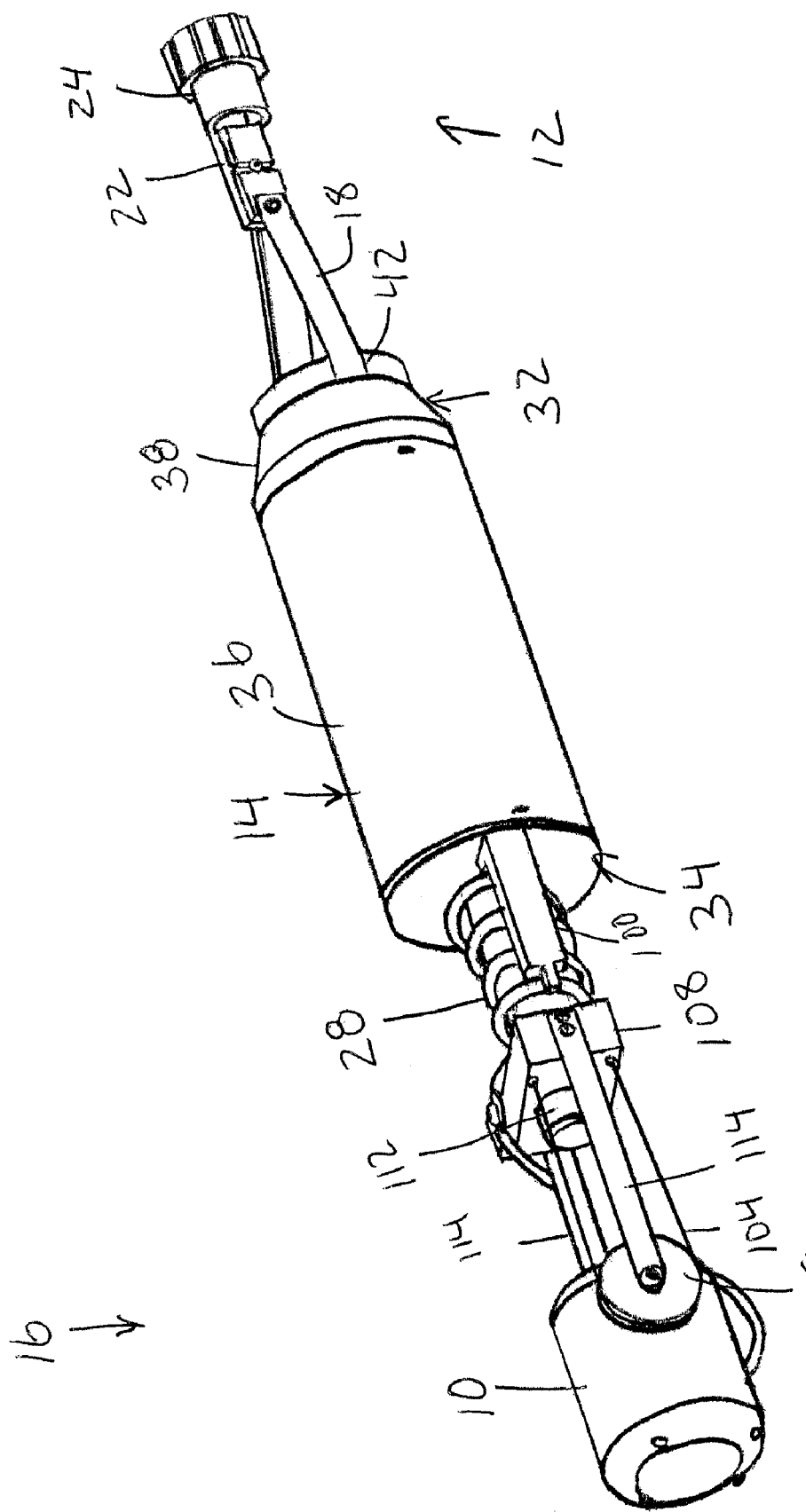
FIG. 1 is a perspective view of a camera actuator system according the present invention.
Figure 2:
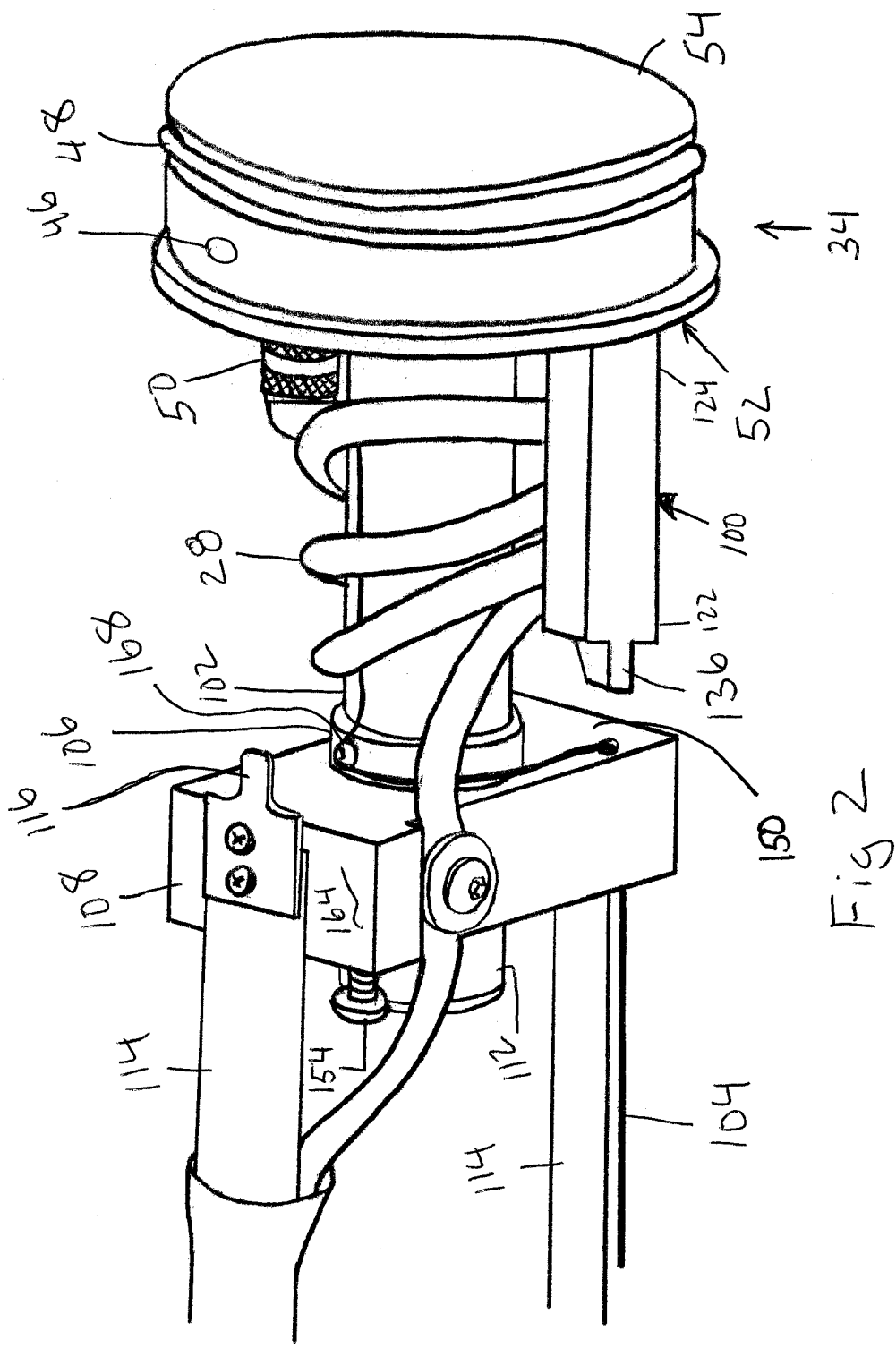
FIG. 2 is a perspective view of components of a camera actuator system according the present invention.
Figure 3:
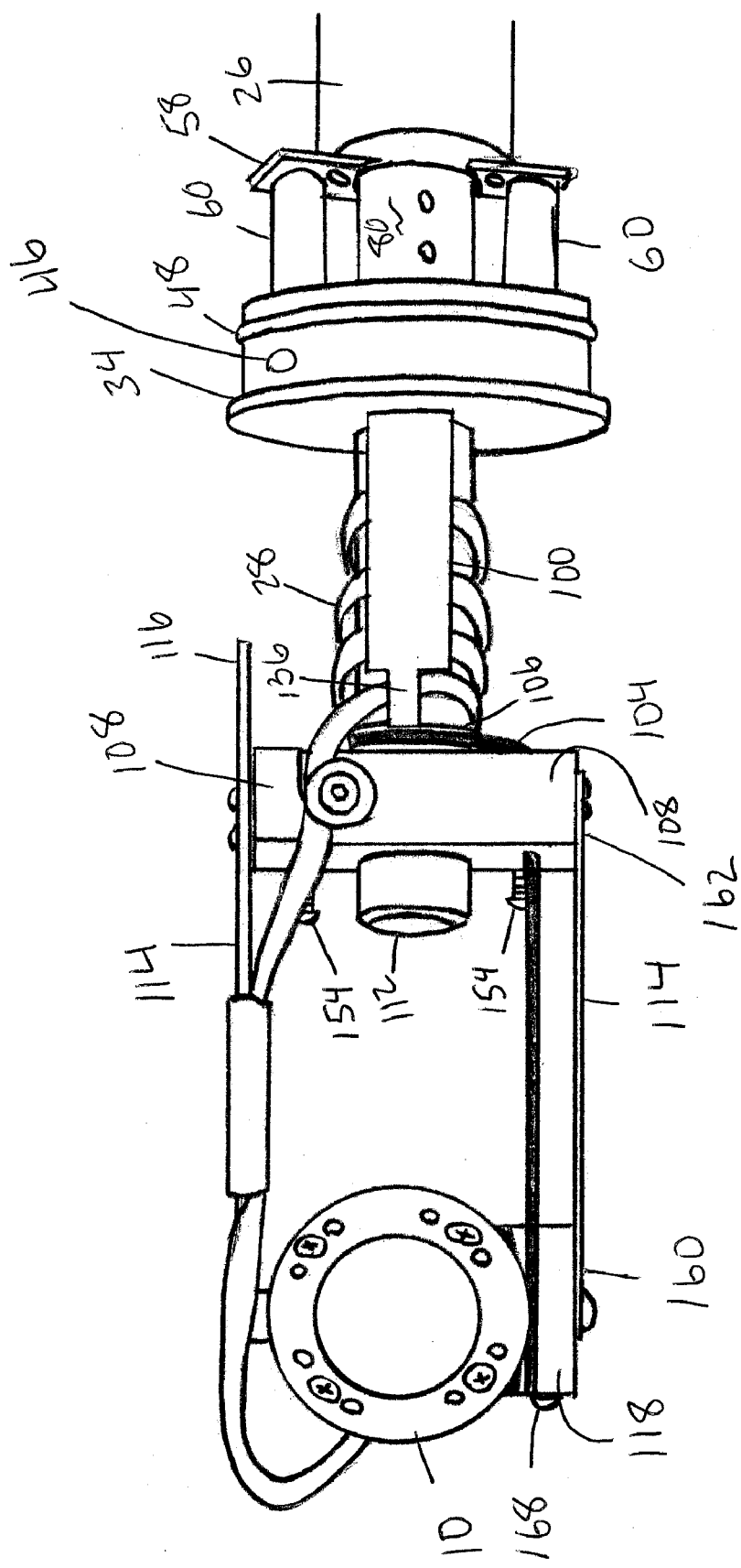
FIG. 3 is a perspective view of components of a camera actuator system according the present invention.
Figure 4:
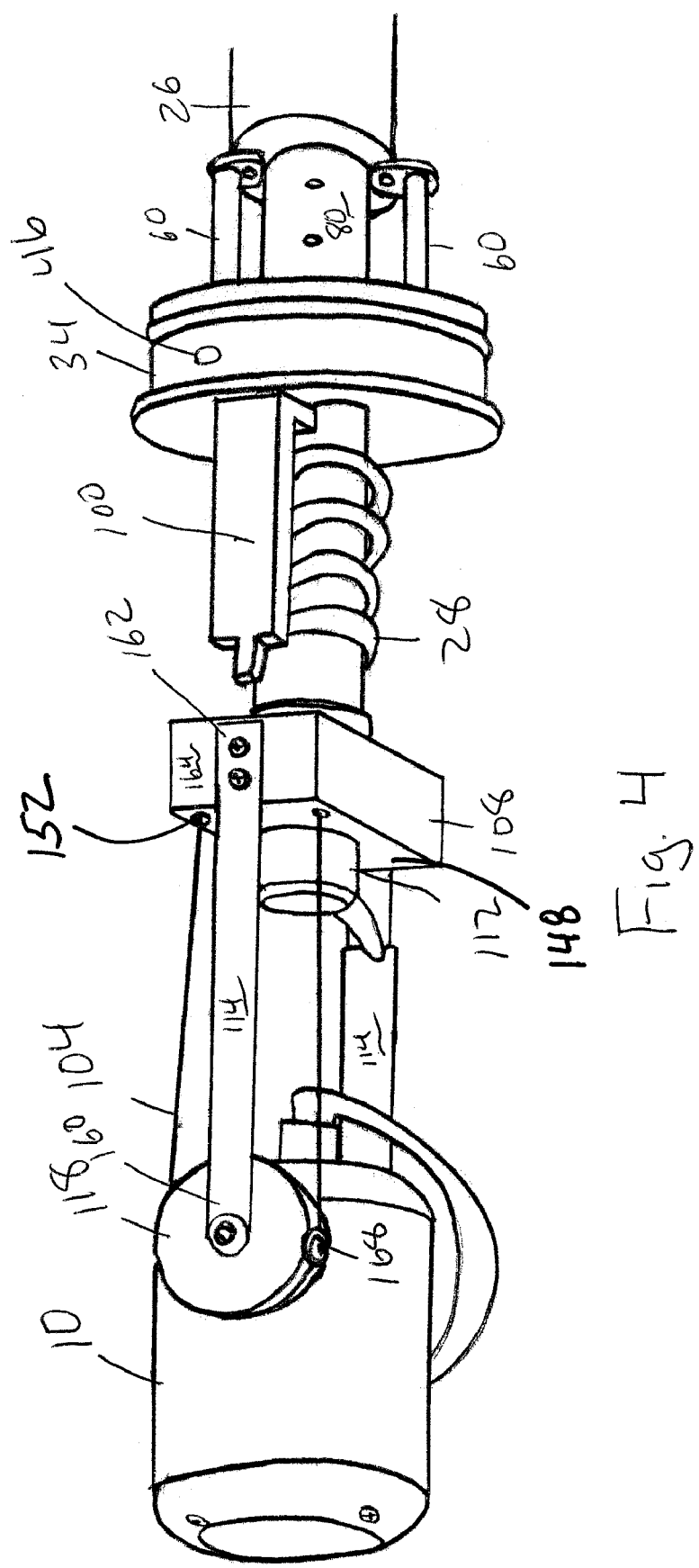
FIG. 4 is a perspective view of components of a camera actuator system according the present invention.

A camera actuator system used to articulate a camera 10, as shown in FIGS. 1-9. The camera actuator system includes an attachment end 12, motor housing 14 and camera end 16. The attachment end is two cable clamp legs 18 which extend from the rear 20 of the motor housing 14 to a cable clamp base 22. The cable clamp base 22 is used as a position to secure any wiring emanating from the motor housing 14. The cable clamp base 22 is shown attached to a PVC pipe coupler 24 which can be attached to a pole or other handling devices for mounting the cable clamp base 22. Attachment of the component parts of the attachment end 12 can be done using simple fasteners, such as screws.

The motor housing 14 houses the motor 26, camera wire 28 and electronics 30 for the camera actuator system. The motor housing 14 includes a rear cap 32, front cap 34 and a main body 36. The main body 36 is an opened ended cylinder to cover the motor 26 and electronics 30. The rear cap 32 is the rear part of the motor housing 14 which attaches to the cable clamp legs 18. The rear cap 32 is shown having an outside surface 38 and an inside surface 40. The outside surface 38 of the rear cap 32 is shown as a cone shape with a cylinder shaped end. The cylinder shaped end includes two rectangular cutouts 42 to receive the cable clamp legs 18. The inside surface 40 of the rear cap 32 is a cylinder shaped plug slightly recessed from the outside surface 38 at the top of the cone shape. The inside surface 40 of the rear cap 32 has holes 46 about the circumference of the inside surface 40 to receive screws which secure the rear cap 32 to the main body 36. A groove with an O-ring 48 inserted is also part of the circumference of the plug of the rear cap 32. The O-ring 48 is used to seal the rear end of the motor housing 14 from dirt and water. The rear cap 32 also includes a wire port 50 on the outside surface 38 which leads through the rear cap 32 into the motor housing 14. The wire port 50 allows the necessary wiring for the camera wire 28 and the electronics 30 to pass into the motor housing 14. The wire port 50 is sealed to prevent the entrance of dirt and water. The front cap 34 is shown having an outside surface 52 and an inside surface 54. The outside surface 52 of the front cap 34 is a flat disc shape and is used as a mounting surface for the actuator components. The inside surface 54 of the front cap 34 is a cylinder shaped plug slightly recessed from the outside surface 52. The inside surface 54 of the front cap 34 has holes 46 about the circumference of the inside surface 54 to receive screws which secure the front cap 34 to the main body 36. A groove with an O-ring 48 inserted are also part of the circumference of the inside surface 54 of the front cap 34. The O-ring 48 is used to seal the front end of the motor housing 14 form dirt and water. The front cap 34 also includes a wire port 50 on the outside surface 52 which leads through the front cap 34 into the motor housing 14. The wire port 50 allows the camera wire 28 to pass from the motor housing 14 to the camera 10. The wire port 50 is sealed to prevent the entrance of dirt and water.

Figure 8:
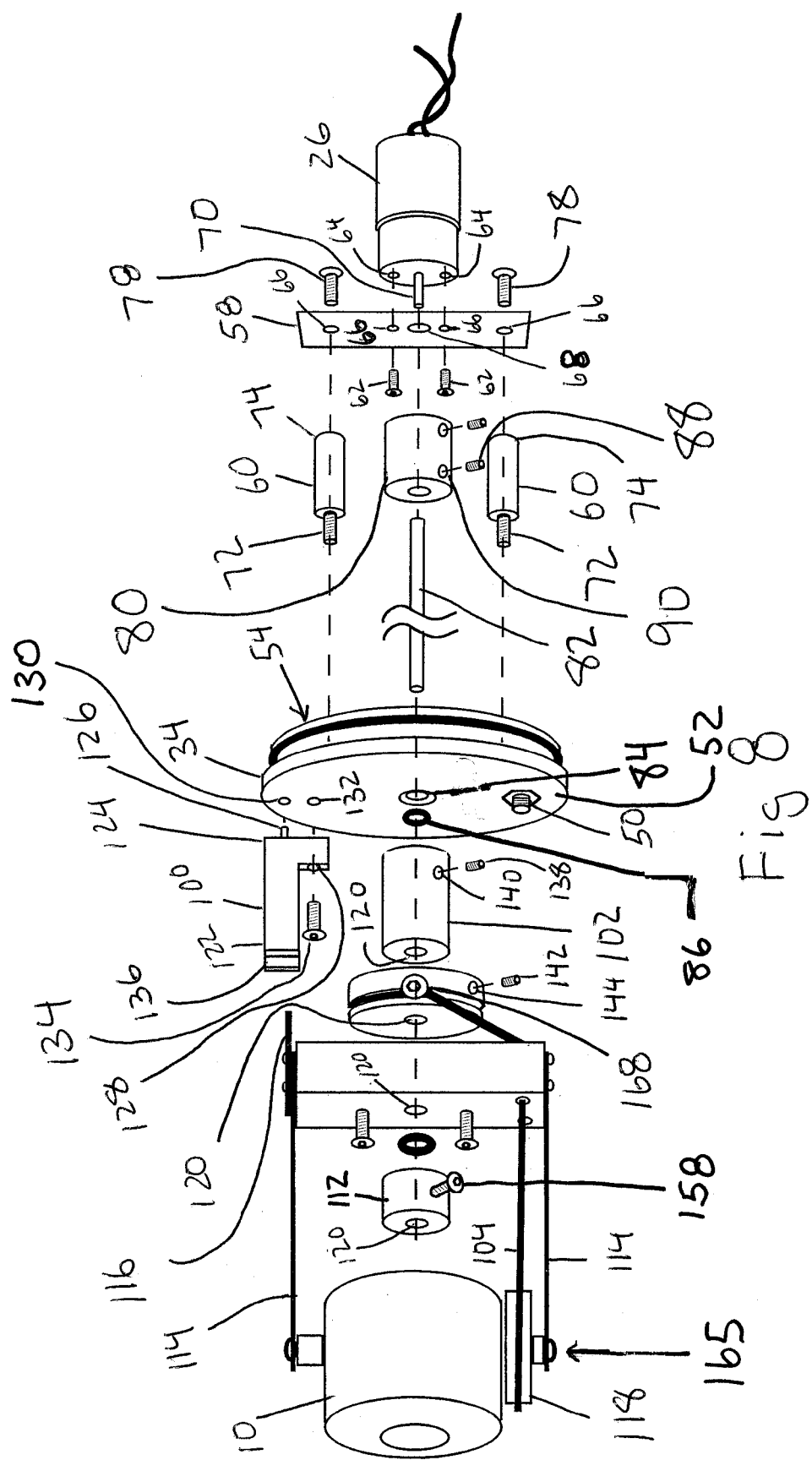
FIG. 8 is an exploded perspective view of components of a camera actuator system according the present invention.

The motor 26 is secured to the front cap 34 using a mounting plate 58 and support studs 60, as shown in FIG. 8.

Figure 5:
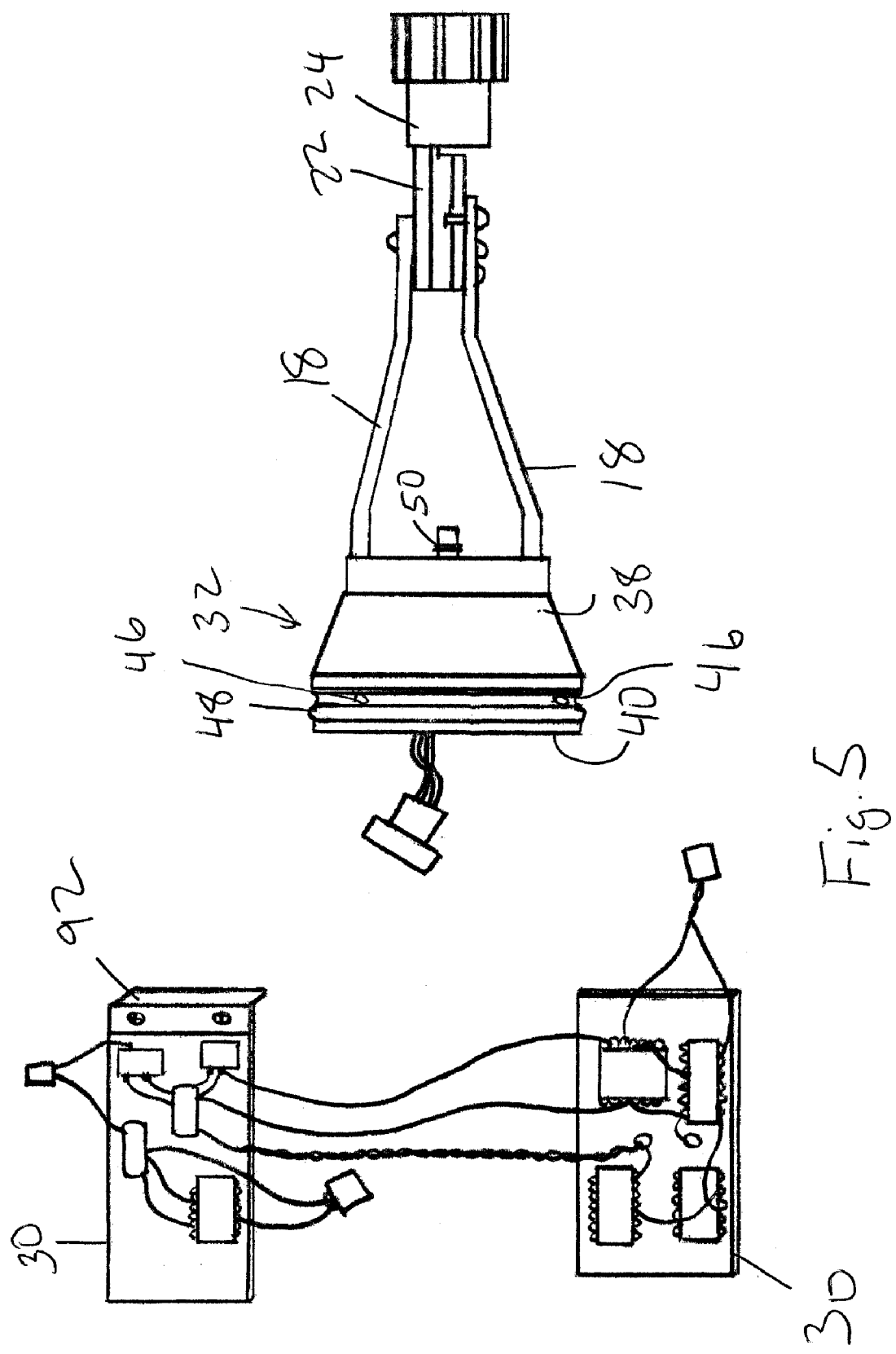
FIG. 5 is a perspective view of components of a camera actuator system according the present invention.
Figure 6:
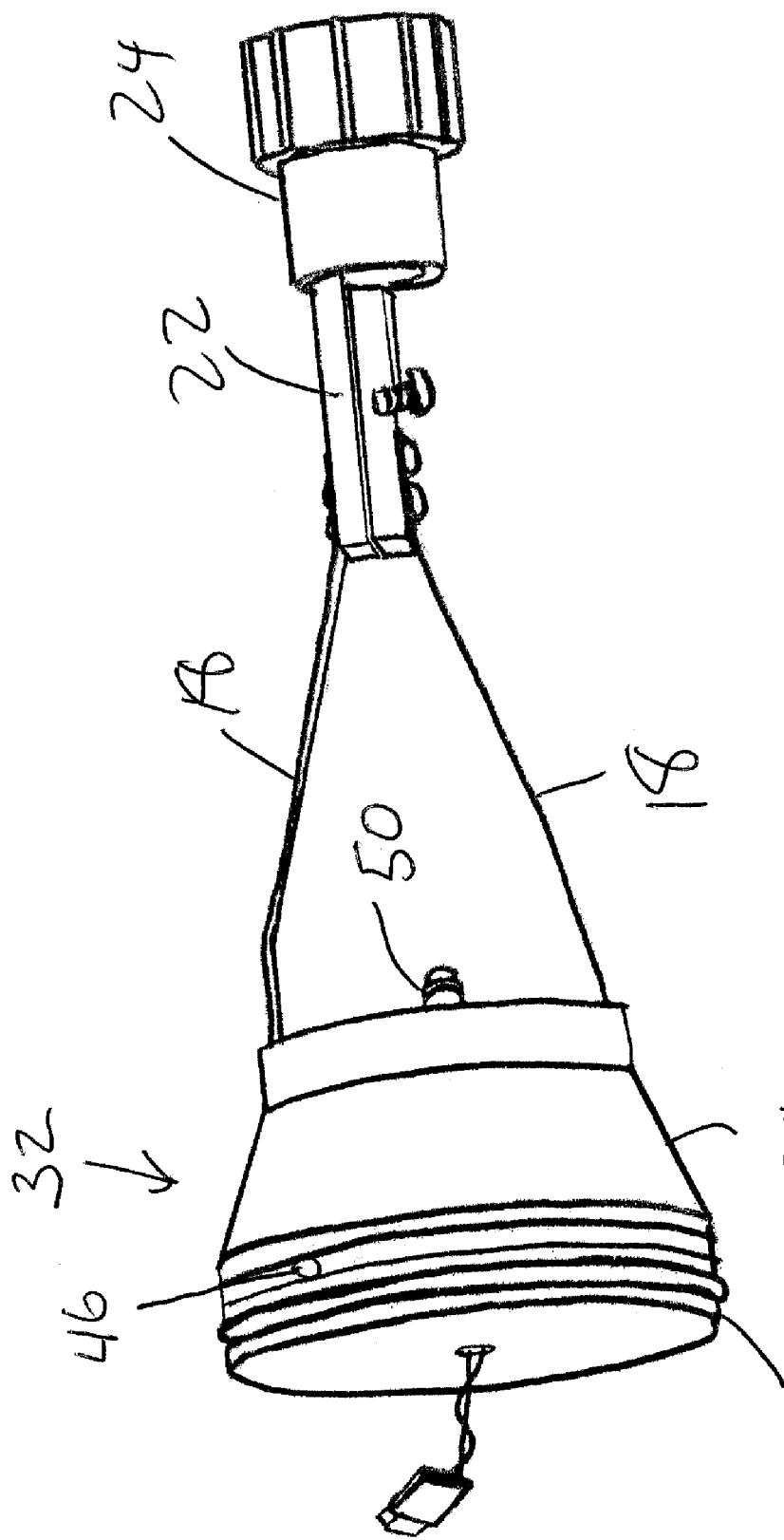
FIG. 6 is a perspective view of components of a camera actuator system according the present invention.
Figure 7:
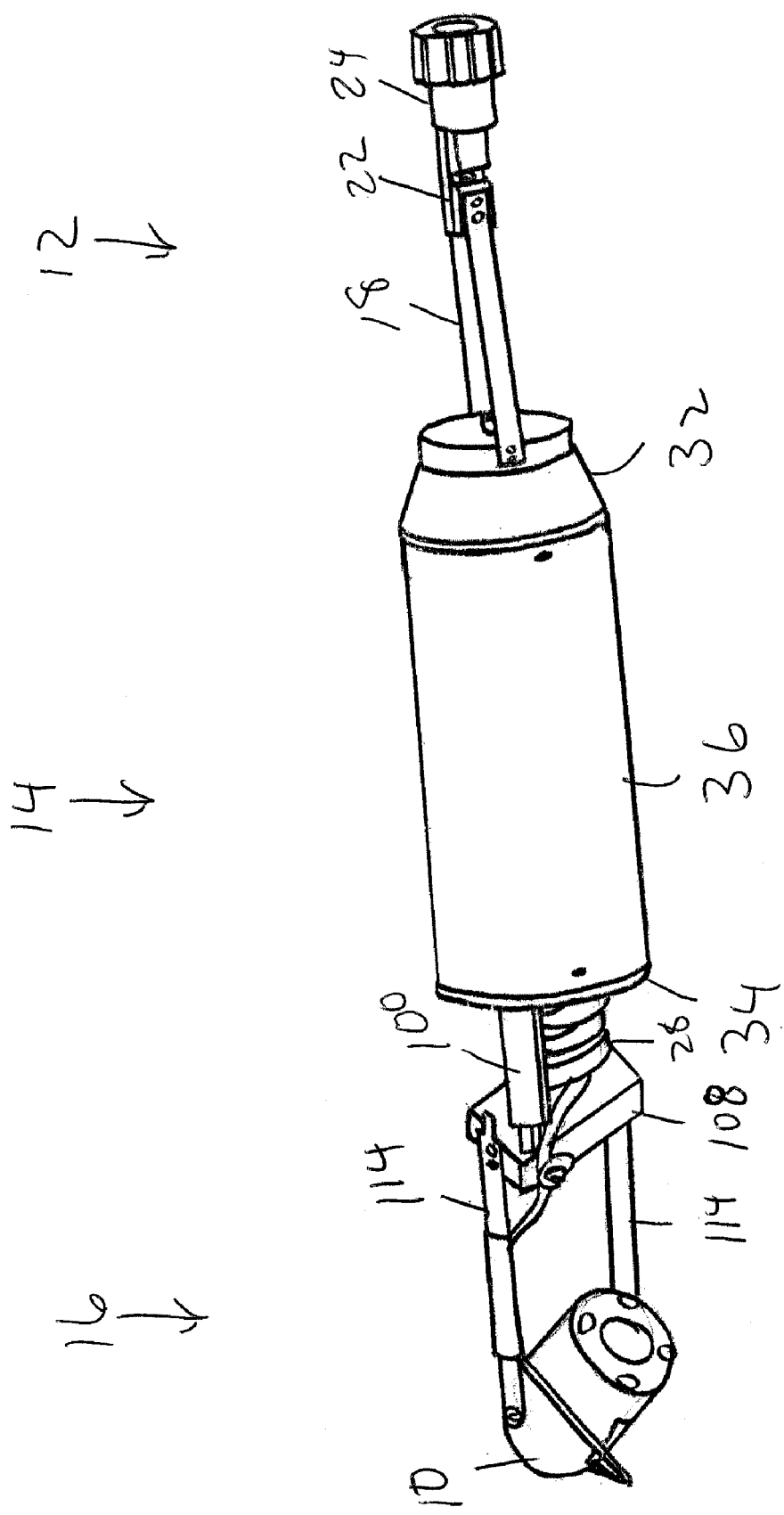
FIG. 7 is a perspective view of a camera actuator system according the present invention.

The motor 26 is secured to the mounting plate 58 using screws 62, which screw into holes 64 of the motor 26. The mounting plate 58 includes screw-pass-through holes 66 for both the motor 26 and the support studs 60, as well as a motor shaft hole 68 to allow passage of a motor shaft 70. Each support stud 60 includes a screw end 72 which screws into the inside surface 54 of the front cap 34. Each support stud 60 includes screw hole end 74 with a screw hole to receive a screw 78 used to attach the mounting plate 58 to each support stud 60. The support studs 60 act as a spacer to allow attachment of a coupler 80 to the motor shaft 70. The coupler 80 is also connected to a drive shaft 82 which is inserted into a shaft hole 84 in the front cap 34. The shaft hole 84 includes a seal 86 to prevent passage of dirt and water into the motor housing 14. The motor shaft 70 and drive shaft 82 are both inserted into the coupler 80 and secured using set screws 88. Two set screws holes 90 for the set screws 88 are shown on the coupler 80. The electronics 30 are usually one or more circuit boards which can be mounted to the inside surface 40 of the rear cap 32 using brackets 92. FIG. 5 shows such a bracket 92 on a circuit board to be mounted to the inside surface 40 of the rear cap 32.

The camera end 16 includes the camera 10 and actuator components. The actuator components are used to move and stop the camera 10. The actuator components are driven by the motor 26. The actuator components include a rear pan stop 100, drive shaft spacer 102, tilt cable 104, rear tilt pulley 106, support block 108, friction O-ring 110, stop collar 112, camera support legs 114, front pan stop 116 and a front tilt pulley 118. The drive shaft spacer 102, rear tilt pulley 106, support block 108, friction O-ring 110 and stop collar 112 all have shaft holes 120, which allow the drive shaft 82 to pass on through to each component.

The rear pan stop 100 includes an front end 122 and a rear end 124. The rear end 124 is shown as an L-shape and includes an alignment pin 126 and a screw hole 128. The face of the outside surface 52 of the front cap 34 includes a pin hole 130 and a screw hole 132. The rear pan stop 100 is attached by inserting the alignment pin 126 into the pin hole 130 and screwing a screw 134 through the screw hole 128 of the rear pan stop 100 and into the screw hole 132 of the front cap 34. The alignment pin 126 and pin hole 130 allow for proper placement of the rear pan stop 100. The rear pan stop 100 includes a stop tab 136 at the front end 122 of the rear pan stop 100. Whereby, the height of the rear pan stop 100 with the stop tab 136 is less then the distance between the front cap 34 and the support block 108. The drive shaft spacer 102 is placed over the drive shaft 82 via the shaft hole 120 in the drive shaft spacer 102. The drive shaft spacer 102 includes a set screw 138 and set screw hole 140 to secure the drive shaft spacer 102 to the drive shaft 82, so that the drive shaft spacer 102 rotates with the drive shaft 102. The drive shaft spacer 102 provides a spacer between the front cap 34 and the rear tilt pulley 106. The drive shaft spacer 102 is also used to protect the camera wire 28 from the drive shaft 82, as the camera wire 28 is shown wrapped around the drive shaft spacer 102.

The rear tilt pulley 106 is placed over the drive shaft 82 via the shaft hole 120 in the rear tilt pulley 106. The rear tilt pulley 106 rests on the drive shaft 82, between the drive shaft spacer 102 and the support block 108. The rear tilt pulley 106 includes a set screw 142 and set screw hole 144 to secure the rear tilt pulley 106 to the drive shaft 82, so that the rear tilt pulley 106 rotates with the drive shaft 82. The support block 108 is placed over the drive shaft 82 via the shaft hole 120 in the support block 108. A friction device shown as a friction O-ring 110 is placed over the drive shaft 82 and placed inside the shaft hole 120 of the support block 108. The friction device provides friction between the drive shaft 82 and the support block 108. The support block 108 includes a front face 148 and a rear face 150. The support block 108 includes two cable holes 152 and two tilt stops 154. The cable holes 152 are positioned along side each other below the front tilt pulley 118. The cable holes 152 provide openings through the support block 108 from the front face 148 to the rear face 150 to allow the tilt cable 104 to travel between the front tilt pulley 118 and rear tilt pulley 106. The tilt stops 154 are two screws partially screw into the front face 148 of the support block 108 and flank the shaft hole 120 of the support block 108. The front pan stop 116 is mounted to the support block 108 and hangs downward from the side of the support block 108, such that the front pan stop 116 can contact the stop tab 136 of the rear pan stop 100.

Figure 9:
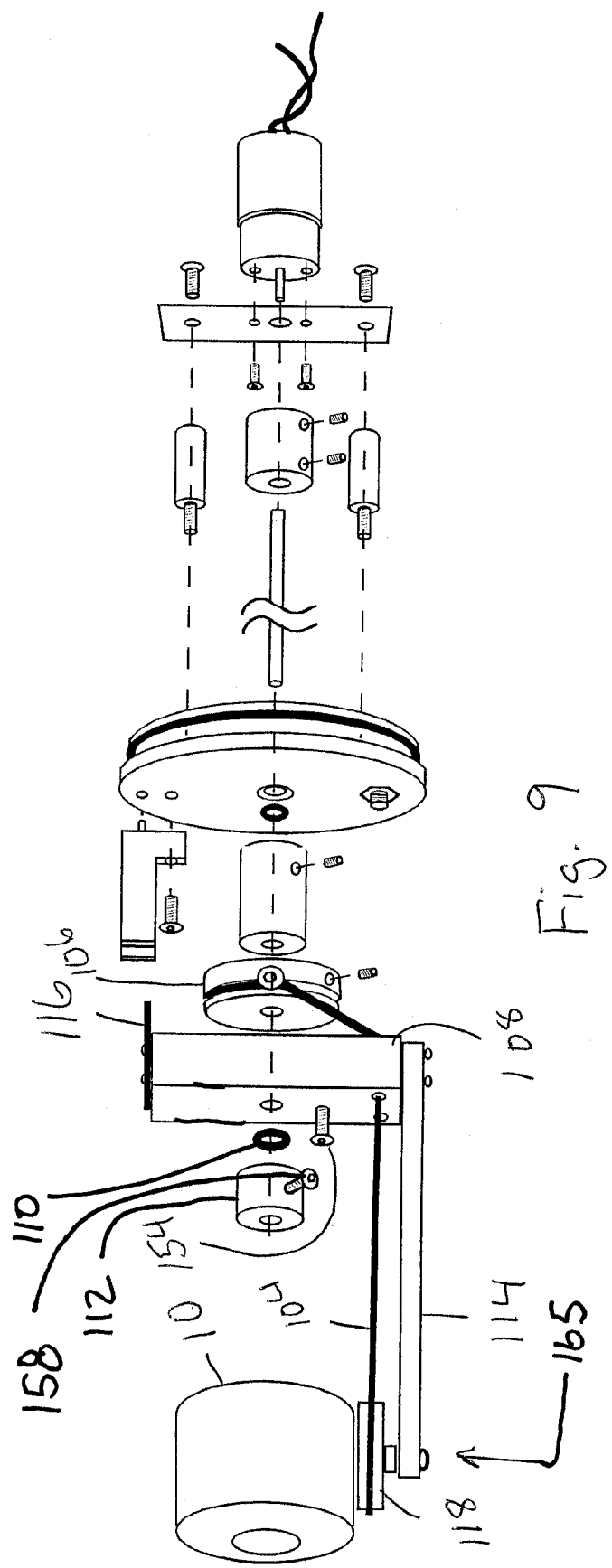
FIG. 9 is an exploded perspective view of components of a camera actuator system according the present invention.

The stop collar 112 mounts to the end of the drive shaft 82. The stop collar 112 is secured to the drive shaft 82 with a set screw 156 in a set screw hole 156, so that the stop collar 112 rotates with the drive shaft 82. The stop collar 112 includes a drive shaft stop 158 extending outward from the side of the stop collar 112. The drive shaft stop 158 is shown as a screw screwed into the side of the stop collar 112. The drive shaft stop 158 is positioned between the two tilt stops 154. The camera support legs 114 each include a front end 160 and rear end 162. The camera support legs 114 are shown attached to the sides 164 of the support block 108 at the rear end 162 of the camera support legs 114 using standard fastening methods. The camera 10 is rotatably mounted between the front end 160 of the supports legs 114 along a rotational axis 165. The mounting of the camera 10 can be as simple as two screws through the camera support legs 114 and into a housing of the camera 10 to form the rotational axis 165. Whereby, the screws are only tighten enough to support the camera 10 and the screws rotate freely within the camera support legs 114. This allows for easy replacement of the camera 10 from the camera actuator system. The front tilt pulley 118 is attached to the camera 10, such that rotation of the front tilt pulley 118 rotates the camera 10 about the rotational axis 165. The front tilt pulley 118 is shown centered on one of the screws and on the rotational axis 165 of the camera 10. The tilt cable 104 runs through the two cable holes 152 in the support block 108 and about both the front tilt pulley 118 and rear tilt pulley 106. The tilt pulley 118 and rear tilt pulley 106 each include grooves 166 to hold the tilt cable 104. The tilt pulley 118 and rear tilt pulley 106 also each include a cable set screw 168 which screws into the tilt pulley 118 and rear tilt pulley 106. The head of the cable set screw 168 sandwiches the tilt cable 104 between the head and the tilt pulley 118 and rear tilt pulley 106 to prevent the tilt cable 104 from slipping along the tilt pulley 118 and rear tilt pulley 106. FIG. 9 shows a different version of FIG. 8 with only one camera support leg 114 and one tilt stop 154.

The camera actuator system operates as follows. When the motor 26 is activated in one direction, the motor 26 rotates the stop collar 112, rear tilt pulley 106 and the support block 108 in unison. The stop collar 112 and rear tilt pulley 106 rotate due to direct attachment of the stop collar 112 and rear tilt pulley 108 to the drive shaft 82. The support block 108 rotates due to the friction of the friction O-ring 110 between the drive shaft 82 and the support block 108. During rotation of the stop collar 112, rear tilt pulley 106 and the support block 108 in unison, the stop collar 112 and rear tilt pulley 106 remain in the same position relative to the support block 108 and the tilt cable 104 and camera 10 remain stationary along the rotational axis 165 of the camera 10. The stop collar 112, rear tilt pulley 106 and the support block 108 will rotate until the front pan stop 116 of the support block 108 contacts the stop tab 136 of the rear pan stop 100. After this contact, the rotation of the support block 108 is restricted and the stop collar 112 and rear tilt pulley 106 continue to rotate due to direct attachment to the drive shaft 82. The stop collar 112 and rear tilt pulley 106 continue to rotate as the motor 26 overcomes the frictional forces of the frictional O-ring 110 between the drive shaft 82 and the support block 108. As the stop collar 112 and rear tilt pulley 106 continue to rotate, the rear tilt pulley 106 rotates about the support block 108 and pulls on the tilt cable 104 in one direction. This causes the tilt cable 104 to move and rotate the front tilt pulley 118, thereby rotating the camera 10 about the rotational axis 165. The camera 10 will continue to rotate until the drive shaft stop 158 of the stop collar 112 contacts a first of the two tilt stops 154. Changing the direction of the rotation of the motor 26 rotates the stop collar 112, rear tilt pulley 106 and the support block 108 approximately three-hundred-and-sixty degrees (360°) in the opposite direction until the front pan stop 116 of the support block 108 again contacts the stop tab 136 of the rear pan stop 100. Then, the camera 10 will rotate until the drive shaft stop 158 of the stop collar 112 contacts the second of the two tilt stops 154. Controlling rotation of the support block 108, stop collar 112 and rear tilt pulley 106 allows the user to position the camera 10 in a desired position. The electronics 30 are used to control the motor 26 and the camera 10. The camera wire 28 is protected and enters the front cap 34 via a water proof port 50. The electronics 30 also include overload protectors to remove power from the motor 10. The overload protectors remove power from the motor 10 when it is sensed that the drive shaft stop 158 of the stop collar 112 is in contact with one of the two tilt stops 154 and the front pan stop 116 is in contact with the rear pan stop 100, thereby preventing damage to the motor 26.

Figure 10:
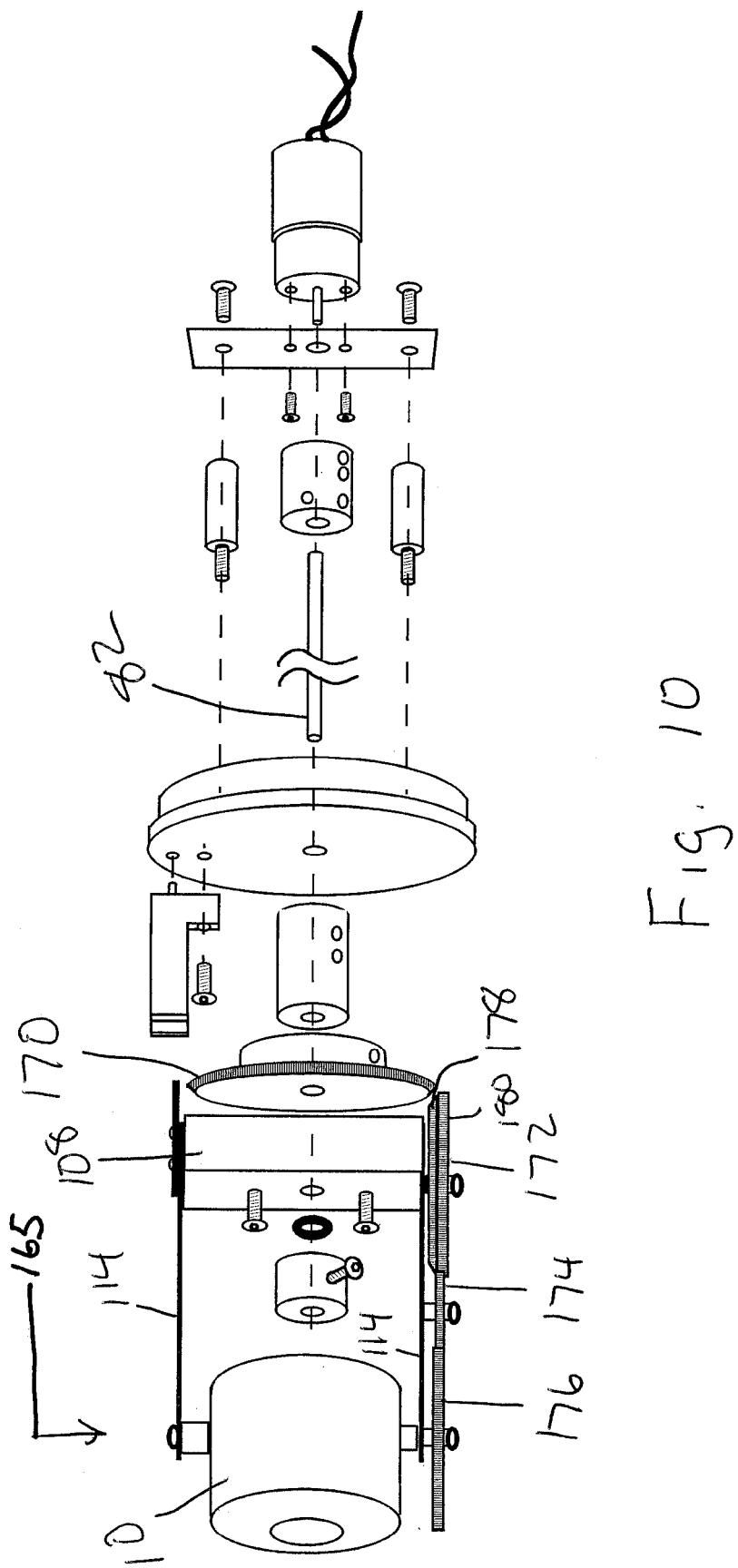
FIG. 10 is an exploded perspective view of components of a camera actuator system according the present invention.
Figure 11:
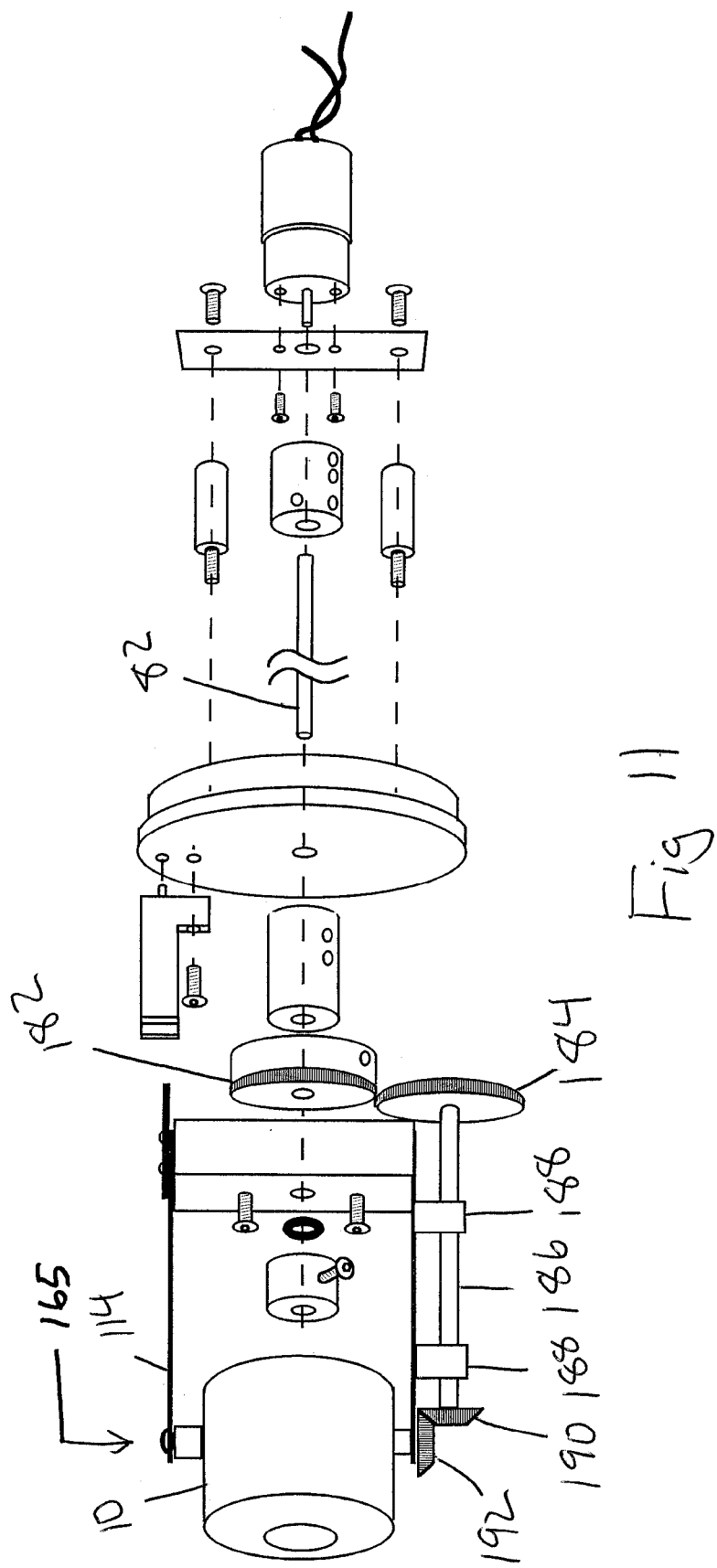
FIG. 11 is an exploded perspective view of components of a camera actuator system according the present invention.

FIGS. 10-11 show other possible replacements for the front tilt pulley 118, rear tilt pulley 106 and the tilt cable 104. FIG. 10 shows a rear bevel gear 170, middle bevel/straight gear 172, middle idler gear 174 and front tilt gear 176 as the replacement. The rear bevel gear 170 is secured to the drive shaft 82 in place of the rear tilt pulley 106. The front tilt gear 176 is attached to the screw used to secure the camera 10 to the camera support leg 114 and rotates with the camera 10 in place of the front tilt pulley 118. The middle bevel/straight gear 172 rotatably attaches to the support block 108 and the middle idler gear 174 rotatably attaches to one of the camera support legs 114. Both the middle bevel/straight gear 172 and the middle idler gear 174 replace the tilt cable 104. The middle bevel/straight gear 172 includes two sections, with one section a bevel gear 178 and the other section a straight gear 180. The middle idler gear 174 interacts between the straight gear 180 of the middle bevel/straight gear 172 and the front tilt gear 176. The bevel gear 178 of the middle bevel/straight gear 172 interacts with the rear bevel gear 170. So that when the rear bevel gear 170 rotates independently of the support block 108, the rear bevel gear 170 rotates the middle bevel/straight gear 172. Rotation of the middle bevel/straight gear 172 in turn rotates the middle idler gear 174 and the middle idler gear 174 rotates the front tilt gear 176.

FIG. 11 shows a rear tilt gear 182, middle straight gear 184, gear shaft 186, two shaft bearings 188, middle bevel gear 190 and front bevel gear 192 as a replacement. The rear tilt gear 182 is secured to the drive shaft 82 in place of the rear tilt pulley 106. The front bevel gear 192 is attached to the screw used to secure the camera 10 to the camera support leg 114 and rotates with the camera 10 in place of the front tilt pulley 118. The two shaft bearings 188 are attached to one of the camera support legs 114 and together rotatably hold the gear shaft 186. The middle straight gear 184 is attached to a rear end of the gear shaft 186. The middle bevel gear 190 is attached to a front end of the gear shaft 186. The combination of the middle bevel gear 190, gear shaft 186 and middle straight gear 184 replaces the tilt cable 104. The middle bevel gear 190 interacts with the front bevel gear 192. The middle straight gear 184 interacts with the rear tilt gear 182. So that when the rear tilt gear 182 rotates independently of the support block 108, the rear tilt gear 182 rotates the middle straight gear 184. Rotation of the middle straight gear 184 in turn rotates the gear shaft 186, which in turn rotates the middle bevel gear 190 that rotates the front bevel gear 192.

Figure 12:
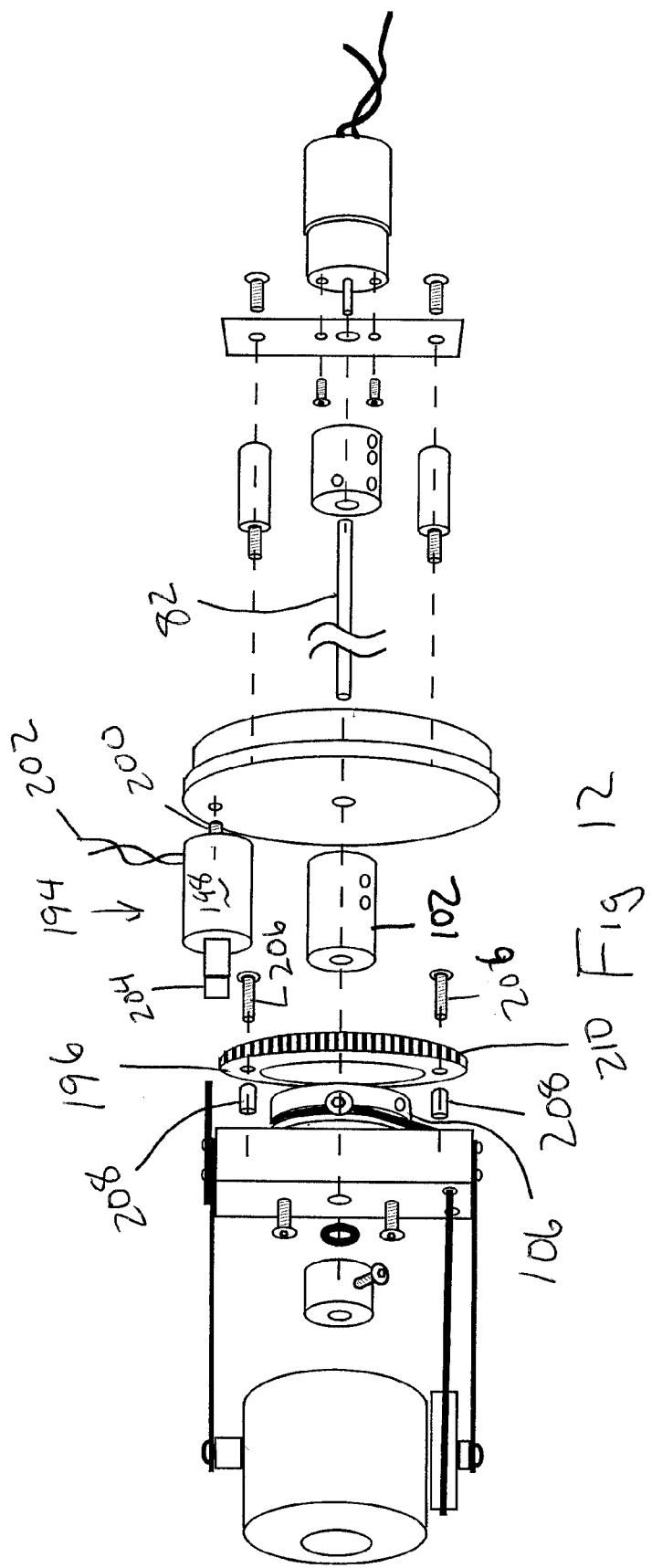
FIG. 12 is an exploded perspective view of components of a camera actuator system according the present invention.
Figure 13:
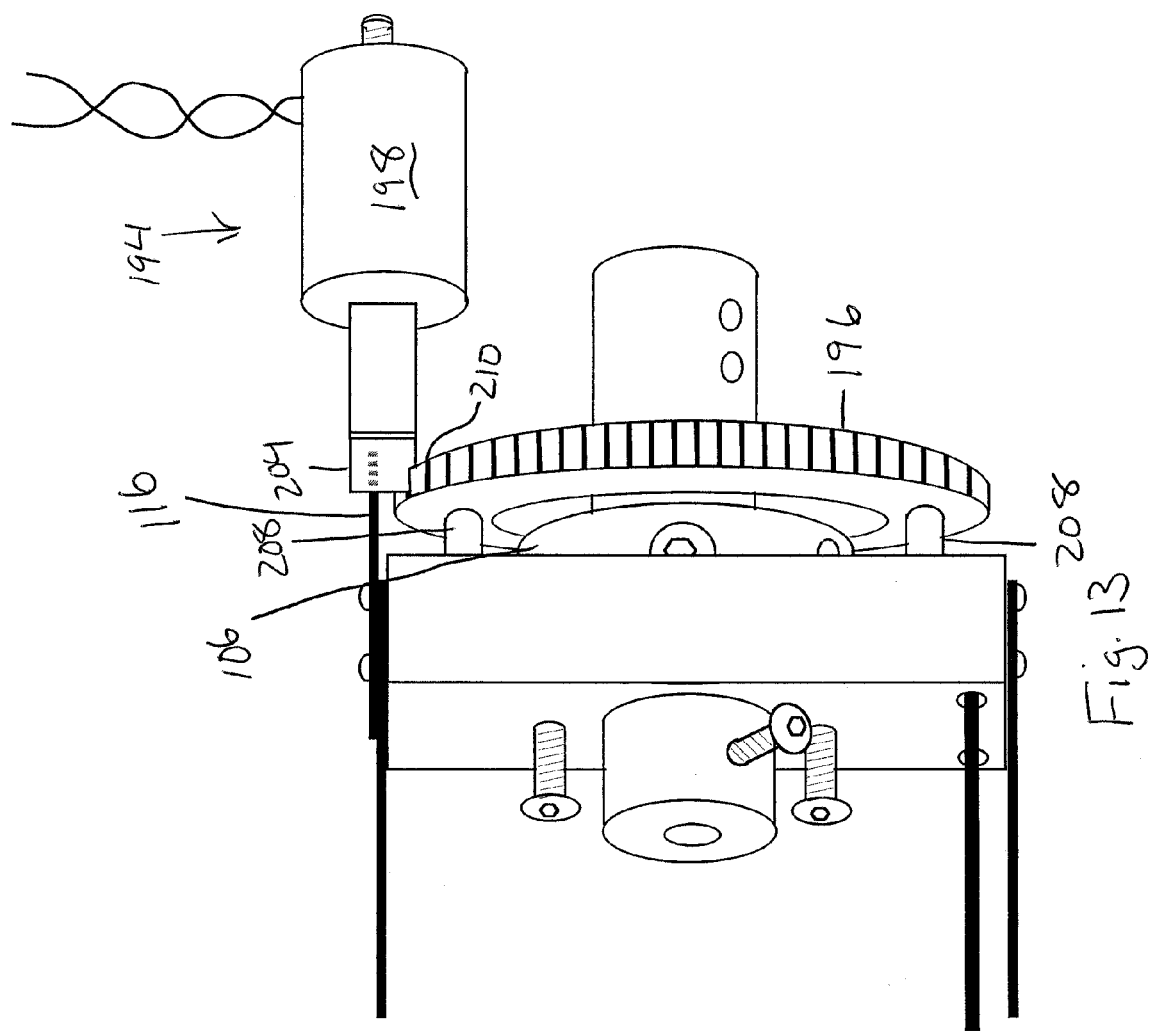
FIG. 13 is a perspective view of components of a camera actuator system according the present invention.
Figure 14:
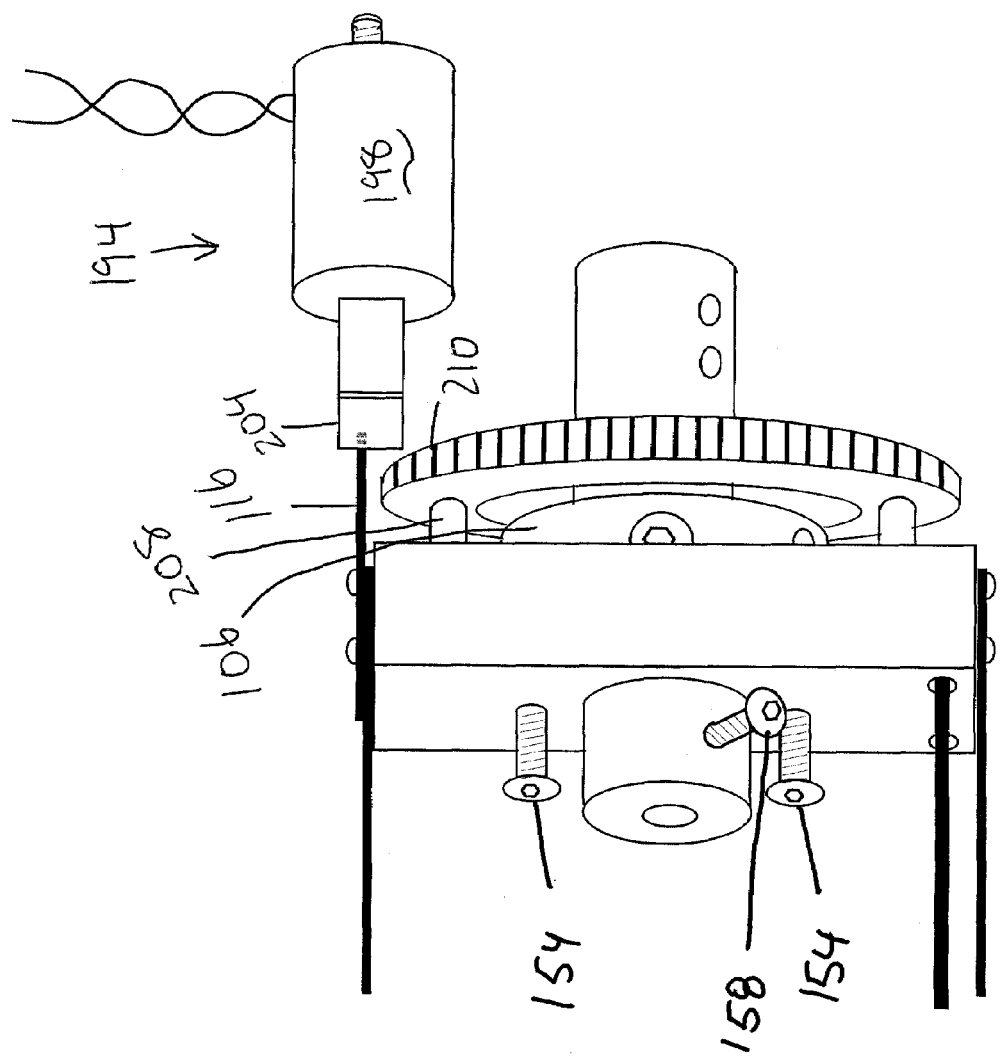
FIG. 14 is a perspective view of components of a camera actuator system according the present invention.

FIGS. 12-14 show a version similar to the one shown in FIGS. 1-9 with rear pan stop 194 and ring gear 196 that replaces the rear pan stop 100. The rear pan stop 194 is shown with a solenoid 198 and includes a mounting stud 200 to allow mounting of the rear pan stop 194 to the front cap 34, as shown. The rear pan stop 194 includes power wires 202 which feed into the motor housing 14 along with the camera wire 28 into the circuit boards to allow control of the solenoid 198 of the rear pan stop 194. The rear pan stop 194 includes a moveable stop arm 204 which is activated and moved by the solenoid 198 of the rear pan stop 194. The ring gear 196 is mounted about the drive shaft 82 and secured to the bottom of the support block 108 between the drive shaft spacer 102 and the rear tilt pulley 106. The ring gear 196 is mounted using two OLE_LINK1 ring gear mounting screws OLE_LINK1 206, which screw into the support block 108. Ring gear spacers 208 slide on the ring gear mounting screws 206 and are used between the ring gear 196 and the support block 108. The ring gear 196 includes teeth 210 about the ring gear 196. FIG. 13 shows the moveable stop arm 204 engaged with the teeth 210 of the ring gear 196. FIG. 14 shows the moveable stop arm 204 disengaged from the teeth 210 of the ring gear 196. Operation of the camera actuator system with the rear pan stop 194 and ring gear 196 is as follows. With the moveable stop arm 204 released from the teeth 210 of the ring gear 196, rotation of the drive shaft 82 rotates the stop collar 112, rear tilt pulley 106, ring gear 196 and support block 108. The support block 108 and ring gear 196 combination rotates due to the friction O-ring 110 between the drive shaft 82 and the support block 108. As shown in FIGS. 13 and 14, there is a front pan stop 116 which engages the moveable stop arm 204, whether the moveable stop arm 204 is engaged or not with the ring gear 196. The front pan stop 116 is aligned with the movable stop arm 204 and the movable stop arm 204 is large enough to allow such engagement of the rear pan stop 194 in either position. The rear pan stop 194 with the movable stop arm 204 now performs the function of not allowing more than three-hundred-and-sixty degree rotation of the support block 108 in any direction and prevents damage to the camera wire 28. When the solenoid 198 of the rear pan stop 194 is activated, the movable stop arm 204 moves and engages between the teeth 210 of the ring gear 196, thereby stopping rotation of the ring gear 196 and support block 108. Stopping rotation of the support block 108 stops spinning of the camera 10, as in all of the above versions using the rear pan stop 100. With the ring gear 196 and support block 108 stopped, the stop collar 112 and rear tilt pulley 106 continue to rotate due to direct attachment to the drive shaft 82. The stop collar 112 and rear tilt pulley 106 continue to rotate as the motor 26 overcomes the frictional forces of the frictional O-ring 110 between the drive shaft 82 and the support block 108. As the stop collar 112 and rear tilt pulley 106 continue to rotate, the rear tilt pulley 106 rotates about the support block 108 and pulls on the tilt cable 104 in one direction. This causes the tilt cable 104 to move and rotate the front tilt pulley 118, thereby rotating the camera 10 about the rotational axis 165 and tilting the camera 10 from a straight-on position. The camera 10 will continue to rotate until the drive shaft stop 158 of the stop collar 112 contacts a first of the two tilt stops 154. The use of the ring gear 196 in a stopped position allows rotation of the drive shaft 82 in the opposite direction and tilting of the camera 10 back in the opposite direction from which it was tilted, without having to rotate the support block 108 first. This allows precise movement of the camera 10 using a simple low maintenance system, while reducing the time and motion needed to move the camera 10. Removal of the moveable stop arm 204 from the teeth 210 of the ring gear 196 allows rotation of the camera 10 in a tilted or un-tilted position. The rear pan stop 194 and ring gear 196 can also be added as part of the versions shown in FIGS. 10-11 in a similar fashion to work with the replacements for the front tilt pulley 118, rear tilt pulley 106 and the tilt cable 104.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

The invention claimed is:

1. A camera actuator system comprising:
   a support block having a front face, rear face and two cable holes;
   at least one camera support leg attached to and extending forward from said support block, said at least one camera support leg each having a rear end attached to said support block and a front end extending away from said support block;
   a camera rotatably attached to said at least one camera support leg near said front end of said at least one camera support leg;
   a front tilt pulley attached to said camera such that rotation of said front tilt pulley rotates said camera about said at least one camera support leg;
   a motor;
   a drive shaft having a rear end connected to said motor and a front end extending up into and through a shaft hole in said support block;
   a stop collar attached to said front end of said drive shaft, said stop collar including a drive shaft stop;
   at least one tilt stop attached to and extending forward of said front face of said support block, said at least one tilt stop positioned on said support block such that said drive shaft stop contacts said at least one tilt stop;
   a rear tilt pulley mounted to said drive shaft below said rear face of said support block;
   a cable routed from said rear tilt pulley, through one of said cable holes of said support block, around said front tilt pulley, through an other of said cable holes of said support block and back to said rear tilt pulley, said cable fixed to said front and rear tilt pulleys;
   a mounting surface between said motor and said support block;
   a rear pan stop fixed to said mounting surface between said mounting surface and said support block;
   a front pan stop extending downward from said support block, said pan stop plate positioned to contact said rear pan stop at some point of rotation of said support block to stop rotation of said support block due to contact.

2. The camera actuator system of claim 1, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

3. The camera actuator system of claim 1, further including electronics to control said motor to rotate said drive shaft, said electronics including override protectors to stop said motor when said electronics senses said at least one tilt stop is in contact with said drive shaft stop of said stop collar and when said front pan stop contacts said rear pan stop.

4. The camera actuator system of claim 1, further including a ring gear mounted on said drive shaft between said mounting surface and said rear tilt pulley; wherein said ring gear is mounted in a fixed position to said rear face of said support block, such that said ring gear rotates with said support block; wherein said ring gear includes teeth with spaces between said teeth; and wherein said rear pan stop includes a movable stop arm which moves such that said movable stop arm can move in and out from said spaces between said teeth of said ring gear to engage and disengage said ring gear, whereby engagement of said ring gear with said moveable stop arm prevents rotation of said ring gear and said support block.

5. The camera actuator system of claim 4, wherein said movable stop arm engages said front pan stop whether said moveable stop arm is engaged or not engaged with said ring gear, whereby said movable stop arm is large enough to allow such engagement of said front pan stop in either position.

6. The camera actuator system of claim 4, further including a solenoid to move said movable stop arm.

7. The camera actuator system of claim 4, further including at least one ring gear spacer between said ring gear and said support block to provide clearance between said ring gear and said rear tilt pulley.

8. The camera actuator system of claim 4, wherein said movable stop arm engages said front pan stop whether said moveable stop arm is engaged or not engaged with said ring gear, whereby said movable stop arm is large enough to allow such engagement of said front pan stop in either position; further including a solenoid to move said movable stop arm; and further including at least one ring gear spacer between said ring gear and said support block to provide clearance between said ring gear and said rear tilt pulley.

9. The camera actuator system of claim 8, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

10. The camera actuator system of claim 4, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

11. A camera actuator system comprising:
a support block having a front face and a rear face;
at least one camera support leg attached to and extending forward from said support block, said at least one camera support leg each having a rear end attached to said support block and a front end extending away from said support block;
a camera rotatably attached to said at least on camera support leg near said front end of said at least one camera support leg;
a front gear attached to said camera such that rotation of said front gear rotates said camera about said at least one camera support leg;
a motor;
a drive shaft having a rear end connected to said motor and a front end extending up into and through a shaft hole in said support block;
a stop collar attached to said front end of said drive shaft, said stop collar including a drive shaft stop;
at least one tilt stop attached to and extending forward of said front face of said support block, said at least one tilt stop positioned on said support block such that said drive shaft stop contacts said at least one tilt stop;
a rear gear mounted to said drive shaft below said rear face of said support block;
a first middle gear attached to said support block which engages said rear gear;
at least one additional middle gear attached to one of said camera support legs between said first middle gear and said front gear, said at least one additional middle gear engaging both said first middle gear and said front gear;
a mounting surface between said motor and said support block;
a rear pan stop fixed to said mounting surface between said mounting surface and said support block;
a front pan stop extending downward from said support block, said pan stop plate positioned to contact said rear pan stop at some point of rotation of said support block to stop rotation of said support block due to contact.

12. The camera actuator system of claim 11, wherein said first middle gear engages said rear gear at a ninety degree angle.

13. The camera actuator system of claim 12, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

14. The camera actuator system of claim 11, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

15. The camera actuator system of claim 11, further including electronics to control said motor to rotate said drive shaft, said electronics including override protectors to stop said motor when said electronics senses said at least one tilt stop is in contact with said drive shaft stop of said stop collar and when said front pan stop contacts said rear pan stop.

16. A camera actuator system comprising:
a support block having a front face and a rear face;
at least one camera support leg attached to and extending forward from said support block, said at least one camera support leg each having a rear end attached to said support block and a front end extending away from said support block;
a camera rotatably attached to said at least one camera support leg near said front end of said at least one camera support leg;
a front gear attached to said camera such that rotation of said front gear rotates said camera about said at least one camera support leg;
a motor;
a drive shaft having a rear end connected to said motor and a front end extending up into and through a shaft hole in said support block;
a stop collar attached to said front end of said drive shaft, said stop collar including a drive shaft stop;
at least one tilt stop attached to and extending forward of said front face of said support block, said at least one tilt stop positioned on said support block such that said drive shaft stop contacts said at least one tilt stop;
a rear gear mounted to said drive shaft below said rear face of said support block;
a gear shaft rotatably mounted to one of said camera support legs between said front and rear gears;
a first middle gear attached to said gear shaft which engages said rear gear;
a second middle gear attached to said gear shaft which engages said front gear;
a mounting surface between said motor and said support block;
a rear pan stop fixed to said mounting surface between said mounting surface and said support block;
a front pan stop extending downward from said support block, said pan stop plate positioned to contact said rear pan stop at some point of rotation of said support block to stop rotation of said support block due to contact.

17. The camera actuator system of claim 16, wherein said second middle gear engages said front gear at a ninety degree angle.

18. The camera actuator system of claim 17, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

19. The camera actuator system of claim 16, further including a friction device in said shaft hole of said support block and about said drive shaft to cause rotation of said support block until said front pan stop contacts said rear pan stop, yet still allow rotation of said drive shaft to rotate said stop collar and said rear tilt pulley.

20. The camera actuator system of claim 16, further including electronics to control said motor to rotate said drive shaft, said electronics including override protectors to stop said motor when said electronics senses said at least one tilt stop is in contact with said drive shaft stop of said stop collar and when said front pan stop contacts said rear pan stop.

* * * * *